United States Patent
Staggs et al.

(10) Patent No.: US 7,970,830 B2
(45) Date of Patent: Jun. 28, 2011

(54) CLOUD COMPUTING FOR AN INDUSTRIAL AUTOMATION AND MANUFACTURING SYSTEM

(75) Inventors: Kevin P. Staggs, Peoria, AZ (US); Paul F. McLaughlin, Ambler, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/416,859

(22) Filed: Apr. 1, 2009

(65) Prior Publication Data
US 2010/0257228 A1    Oct. 7, 2010

(51) Int. Cl.
*G06F 15/16*    (2006.01)
*G06F 19/00*    (2006.01)
(52) U.S. Cl. .................. 709/205; 700/99; 709/226
(58) Field of Classification Search .......... 709/212–216; 700/95, 99–104
See application file for complete search history.

(56) References Cited

U.S. PATENT DOCUMENTS

| | | | |
|---|---|---|---|
| 5,657,390 A * | 8/1997 | Elgamal et al. | 713/151 |
| 6,480,896 B1 * | 11/2002 | Brown et al. | 709/231 |
| 6,816,973 B1 | 11/2004 | Gleichauf et al. | |
| 7,130,891 B2 * | 10/2006 | Bernardin et al. | 709/218 |
| 7,461,403 B1 | 12/2008 | Libenzi et al. | |
| 7,548,977 B2 * | 6/2009 | Agapi et al. | 709/226 |
| 7,584,274 B2 * | 9/2009 | Bond et al. | 709/223 |
| 7,620,986 B1 | 11/2009 | Jagannathan et al. | |
| 7,636,764 B1 | 12/2009 | Fein et al. | |
| 7,684,876 B2 * | 3/2010 | Grgic | 700/19 |
| 2003/0014498 A1 | 1/2003 | Kreidler et al. | |
| 2003/0120778 A1 * | 6/2003 | Chaboud et al. | 709/225 |
| 2004/0002943 A1 * | 1/2004 | Merrill et al. | 707/1 |
| 2004/0128539 A1 | 7/2004 | Shureih | |
| 2005/0021594 A1 * | 1/2005 | Bernardin et al. | 709/200 |
| 2005/0276228 A1 | 12/2005 | Yavatkar et al. | |
| 2005/0278441 A1 * | 12/2005 | Bond et al. | 709/223 |
| 2006/0004786 A1 | 1/2006 | Chen et al. | |
| 2006/0059163 A1 | 3/2006 | Frattura et al. | |

(Continued)

FOREIGN PATENT DOCUMENTS

WO    WO 2005020179 A1 *    3/2005

OTHER PUBLICATIONS

Aaron Skonnard, "Why Service Virtualization Matters", Microsoft Services, 4 pages.

(Continued)

*Primary Examiner* — Brendan Higa
(74) *Attorney, Agent, or Firm* — Munck Carter, LLP

(57) ABSTRACT

A system includes a computing cloud having at least one data storage unit and at least one processing unit. The computing cloud is configured to provide at least one service. The system also includes a client configured to communicate with the computing cloud and to selectively offload data to the computing cloud based upon one or more specified criteria. The client is also configured to offload processes to the computing cloud based upon the one or more specified criteria and to use the at least one service of the computing cloud. At least one of the specified criteria may be based upon a determination of whether the data is required for at least one real time process and/or a determination of whether each process is required for at least one real time process. The system may be used in a data storage and retention application or in an industrial automation application.

20 Claims, 6 Drawing Sheets

U.S. PATENT DOCUMENTS

| | | | |
|---|---|---|---|
| 2006/0155633 A1* | 7/2006 | Fellenstein et al. | 705/37 |
| 2006/0184626 A1* | 8/2006 | Agapi et al. | 709/205 |
| 2006/0230149 A1 | 10/2006 | Jackson | |
| 2007/0055702 A1 | 3/2007 | Fridella et al. | |
| 2008/0120414 A1* | 5/2008 | Kushalnagar et al. | 709/226 |
| 2008/0159289 A1* | 7/2008 | Narayanan et al. | 370/392 |
| 2008/0270523 A1* | 10/2008 | Parmar et al. | 709/203 |
| 2009/0125370 A1 | 5/2009 | Blondeau et al. | |
| 2009/0210071 A1 | 8/2009 | Agrusa et al. | |
| 2009/0271012 A1* | 10/2009 | Kopka et al. | 700/83 |
| 2009/0300151 A1* | 12/2009 | Friedman et al. | 709/222 |
| 2009/0300210 A1* | 12/2009 | Ferris | 709/235 |
| 2009/0300635 A1* | 12/2009 | Ferris | 718/104 |
| 2010/0022231 A1* | 1/2010 | Heins et al. | 455/418 |
| 2010/0042720 A1* | 2/2010 | Stienhans et al. | 709/226 |
| 2010/0256794 A1 | 10/2010 | McLaughlin et al. | |
| 2010/0256795 A1 | 10/2010 | McLaughlin et al. | |
| 2010/0257227 A1 | 10/2010 | McLaughlin et al. | |
| 2010/0257605 A1 | 10/2010 | McLaughlin et al. | |

OTHER PUBLICATIONS

Paul F. McLaughlin, et al., "Cloud Computing As a Basis for a Process Historian", U.S. Appl. No. 12/416,830, filed Apr. 1, 2009.

Paul F. McLaughlin, et al., "Cloud Computing for a Manufacturing Execution System", U.S. Appl. No. 12/416,790, filed Apr. 1, 2009.

Paul F. McLaughlin, et al., "Cloud Computing As a Basis for Equipment Health Monitoring Service", U.S. Appl. No. 12/416,848, filed Apr. 1, 2009.

"Real-Time Data Hosting . . . ", www.industrialevolution.com/ms_services_host.html, 1 page.

Notification of Transmittal of the International Search Report and the Written Opinion of the International Searching Authority, or the Declaration dated Oct. 29, 2010 in connection with International Patent Application No. PCT/US2010/028208.

Notification of Transmittal of the International Search Report and the Written Opinion of the International Searching Authority, or the Declaration dated Oct. 29, 2010 in connection with International Patent Application No. PCT/US2010/028218.

Notification of Transmittal of the International Search Report and the Written Opinion of the International Searching Authority, or the Declaration dated Oct. 29, 2010 in connection with International Patent Application No. PCT/US2010/028210.

* cited by examiner

CLOUD COMPUTING FOR AN INDUSTRIAL AUTOMATION AND MANUFACTURING SYSTEM

TECHNICAL FIELD

This disclosure relates generally to computer systems and, more specifically, to the use of cloud computing in industrial applications, and systems and methods related to the use of cloud computing in industrial applications.

BACKGROUND

Cloud computing is an emerging technology in the information technology (IT) industry. Cloud computing allows for the moving of applications, services and data from desktop computers back to a main server farm. The server farm may be off premises and be implemented as a service. By relocating the execution of applications, deployment of services, and storage of data, cloud computing offers a systematic way to manage costs of open systems, centralize information, and enhance robustness and reduce energy costs.

SUMMARY

This disclosure provides a system and method for using cloud computing in industrial applications.

In one embodiment, a system includes a computing cloud with at least one data storage unit and at least one processing unit. The computing cloud is configured to provide at least one service. In addition, the system includes a client that is configured to communicate with the computing cloud and to selectively offload data to the computing cloud based upon one or more specified criteria. The client is also configured to offload processes to the computing cloud based upon the one or more specified criteria. The client is further configured to use at least one service of the computing cloud.

In another embodiment, a method includes determining which data among a group of data are to be stored in a local environment and determining which processes among a group of processes are to be performed in the local environment. The method also includes sending data that are not to be stored in the local environment to a computing cloud and delegating processes that are not to be performed in the local environment to the computing cloud. In addition, the method includes operating the local environment by using the data stored in the local environment and the data stored in the computing cloud and by using the processes performed in the local environment and the processes performed in the computing cloud. The determination of which data are to be stored locally and which processes are to be performed locally are based upon one or more specified criteria.

In yet another embodiment, an apparatus includes at least one network interface configured to provide a service bus connection. The apparatus also includes at least one data storage unit configured to provide shared storage space through the service bus connection. In addition, the apparatus includes at least one processing unit configured to provide functional services through the at least one service bus connection. The apparatus is configured to provide services based upon one or more specified criteria. At least one of the specified criteria is based upon whether a functional service is a high level or low level function, and the apparatus is configured to provide industrial automation support for high level functions.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
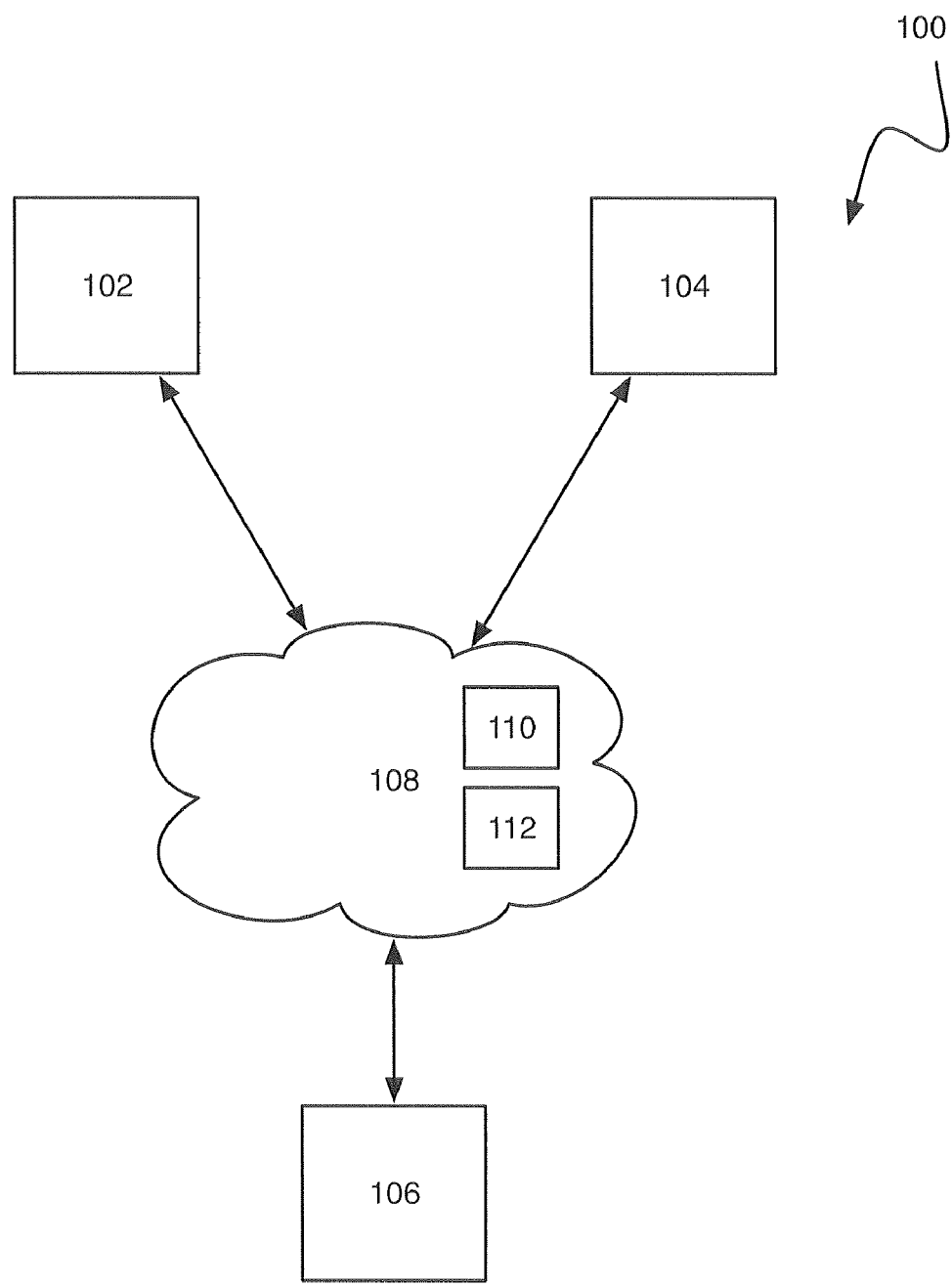
FIG. 1 illustrates an example cloud computing environment according to this disclosure.

FIG. 1 illustrates an example cloud computing environment 100 according to this disclosure. In this example, various clients 102-106 are connected to a computing cloud 108. One innovative aspect of this disclosure is the ability to design a flexible, robust cloud 108 that can service a variety of deployment environments through an innovative hybrid approach. This hybrid approach recognizes both the type of information needed as well as the location of where that information needs to be. For instance, in a manufacturing execution system (MES) used in an automated factory setting, the system can recognize both the types of information needed to be processed as well as which information needs to be stored locally and which information may be stored in a computing cloud.

The computing cloud 108 is a computing cloud that is capable of both storing information and performing data functions on information. The computing cloud 108 is also accessible from a remote location. The computing cloud 108 includes at least one processing unit 110 and at least one data storage unit 112, both of which are accessible to clients 102-106. The computing cloud 108 may, for example, include hardware that is cost prohibitive to deploy and maintain at individual clients 102-106. As another example, the computing cloud 108 may include software that is cost prohibitive to install, deploy, and maintain at individual clients 102-106. Therefore, the computing cloud 108 may provide this hardware and software through secure connections to clients 102-106. While there is one computing cloud 108 shown in FIG. 1, multiple clouds could be used in the environment 100.

The clients 102-106 represent individual computers, plant sites, or operational locations that are in communication with the computing cloud 108. The clients 102-106 are capable of accessing both the processing unit(s) 110 and storage unit(s) 112 that are located in the computing cloud 108. The clients 102-106 are also able to access both local processes as well as information from the computing cloud 108.

The clients 102-106 communicate with the computing cloud 108 using any secured or unsecured method, such as Hypertext Transfer Protocol Secure (HTTPS), secure telnet, or file transfer protocol secure (FTPS). It is understood that secure methods may be preferred over unsecure methods and that the particular method chosen may depend upon the requirements of the function being accessed. This disclosure is limited to any particular protocol or method of transferring data.

It us understood that the communication between the clients 102-106 and the computing cloud 108 may be unidirectional or bidirectional. The phrase "unidirectional communication" refers to communication in which data is sent from one communications device to a second communications device. The term "bidirectional communication" refers to communication where data is sent and received by two or more communication devices.

In some embodiments, the computing cloud 108 may leverage a Service Oriented Architecture (SOA) to abstract consumers of cloud services from the location services themselves. When a cloud user at a given client 102-106 invokes a function, such as an MES function, that function could be performed by MES components local to the same client, or the client can be redirected to MES components running on a server or other device in the computing cloud 108. This redirection is supported by a service bus that exposes a set of service endpoints to users who interact with these services as if the services were local. The service bus directs requests for those services to the appropriate service providers either locally or in the cloud 108 based on a configured mapping. Mapping can be done on a per service basis, allowing a mix of local and cloud-based services to be used. The service bus itself could be local to the client or located in the cloud 108. The disclosed systems and methods can be designed for multi-tenancy, such that many companies can share the same physical database resources but keep their respective data entirely private.

One of the innovative features of this disclosure is the use of a hybrid approach when distributing data storage and data processing among one or multiple clouds in use by a manufacturing execution or other system. Some features of the clients 102-106 can be better performed by the computing cloud 108 than at the clients 102-106. By determining which functions can be performed more efficiently in the computing cloud 108 than at the local clients 102-106, computing resources can be allocated in such a way as to maximize performance.

Figure 2:
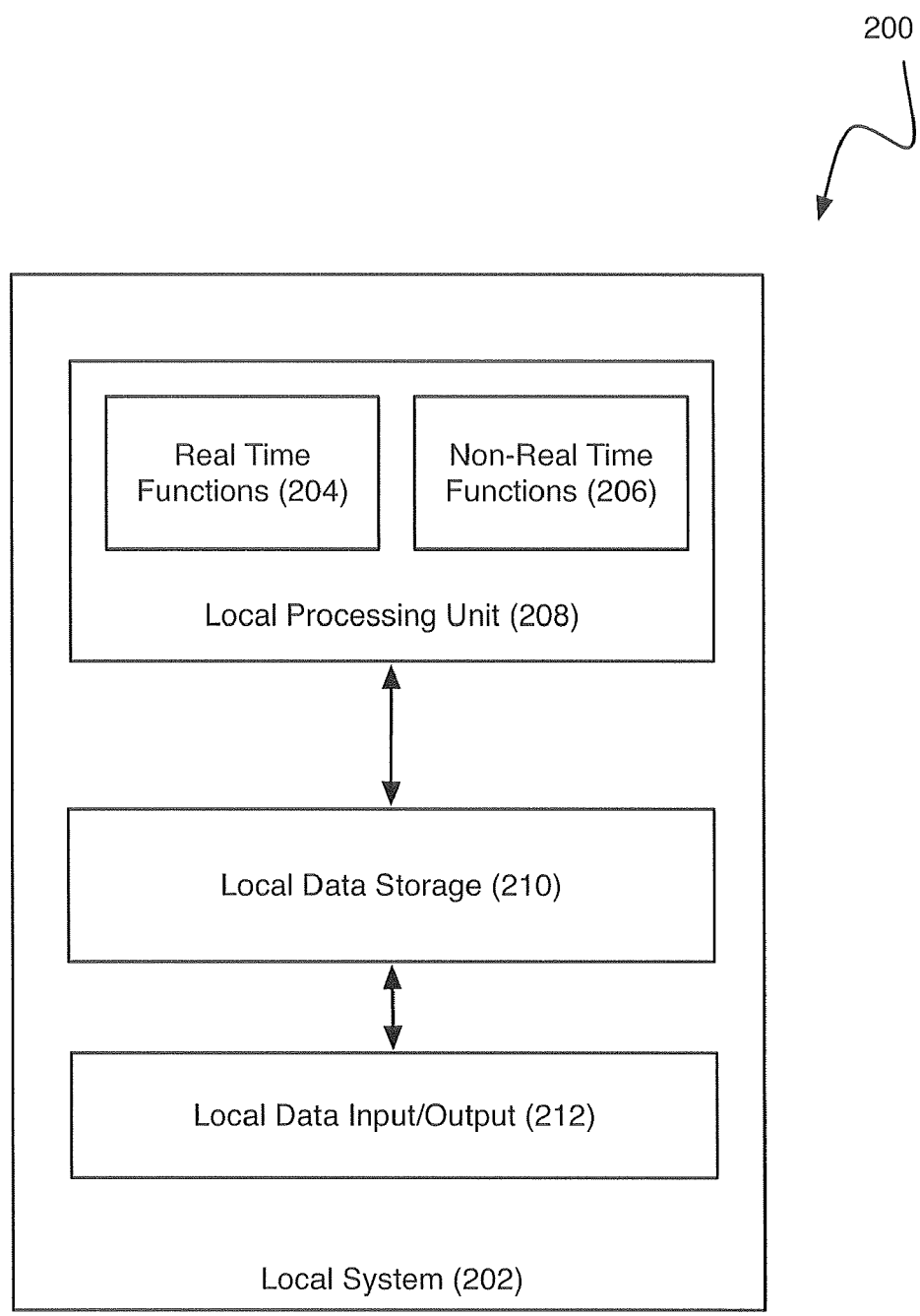
FIG. 2 illustrates an example local system environment according to this disclosure.

FIG. 2 illustrates an example local system environment 200 according to this disclosure. Each client 102-106 in FIG. 1 includes or is otherwise associated with a local system 202. The local system 202 includes a local processing unit 208, a local data storage unit 210, and a local data input/output 212. The local processing unit 208 may include both real time functions 204 and non-real time functions 206.

Real time functions 204 may include functions that instruct or control other devices, such as the actual mechanical systems used in a factory. These real time functions 204 are often required to be available continuously and may be designed to be non-resource intensive. An example of a real time function 204 is the programming of a basic automated system to perform a specific function (such as to drill into a substance) for a specific time.

Non-real time functions 206 may include functions that can be used to form or support the real time functions 204. Examples of non-real time functions 206 are those functions used to train real time functions 204 and simulations of the products created by the real time functions 204. These non-real time functions 206 may be processor-intensive and require specialized software.

Not only may functions be performed on a real time or non-real time basis, data may be required by the system on a real time or non-real time basis. In some embodiments, data that is required on a real time basis may be stored locally in the local data storage 210, while data that is not needed on a real time basis may be stored in the storage unit 112 in the computing cloud 108.

One problem with the deployment of conventional MES systems is that the most accurate simulation models are often too expensive to deploy into the local systems 202. Also, the most accurate simulation models often have storage requirements that exceed the available storage of the local data storage 210. This disclosure overcomes these problems through a process of both data and process segregation. By determining whether a specific process or specific data is required to be performed in real time or in non-real time, those functions that can be delayed (and their associated data) may be placed into the computing cloud 108.

The delineation between real time and non-real time is intended to be an example method of determining which processes and data should be stored locally and which processes and data should be stored in the computing cloud 108. Other delineations may also be used, such as those based on the priority or other characteristics of the data. Any system or method that delineates shared processes and storage and then executes the system and method using a hybrid approach on both a computing cloud 108 and a local system 202 could be used.

Another example of a delineation that may be used to determine which data and which functions are to be placed into the computing cloud 108 is based upon whether the data and functions are "high level" or "low level." A high level function may include a function that is not directly tied to the actual operation of a piece of machinery. Examples of high level functions may include scheduling, reconciliation, or other functions that may be executed in the computing cloud 108.

One advantage to the disclosed hybrid approach is the enhancement of manufacturing execution systems. Manufacturing execution systems are used to provide instructions or routines to basic automated systems. Basic automated systems in turn are used to instruct systems directly on what actions to perform (such as the actual operation of automation hardware).

Another advantage to the disclosed hybrid approach is the ability to rapidly deploy new services or features to a plurality of clients without the need to make changes to the clients themselves. As a new service becomes available (such as when a simulation becomes available), this service may be offered to improve the manufacturing process at a given site without the need for reprogramming at the site.

Yet another advantage to the disclosed hybrid approach is the ability for enhanced data collection and analysis. Through the linking of the clients 102-106 to the computing cloud 108, data that represents real time information related to the processes may be uploaded to the cloud 108 by the clients 102-106. This information may in turn be used by the computing cloud 108 for a number of functions, such as monitoring the production results and identifying potential problems with equipment. In some embodiments, the cloud 108 may apply a model, such as a heuristic model, to identify potential equipment failure. This would allow for proactive preventative maintenance of the equipment.

Figure 3:
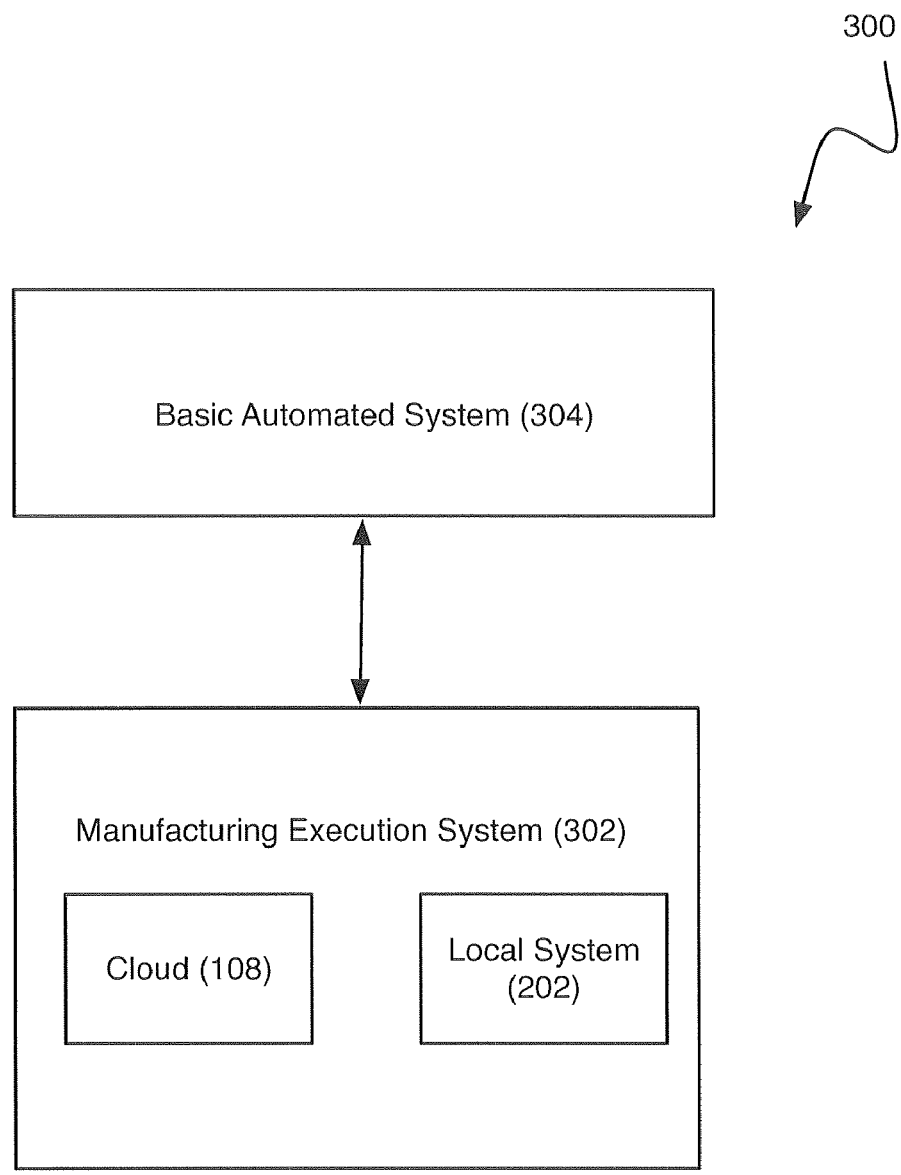
FIG. 3 illustrates an example manufacturing system according to this disclosure.

FIG. 3 illustrates an example manufacturing system 300 according to this disclosure. In this example, the manufacturing system 300 includes a manufacturing execution system 302 having both the computing cloud 108 and the local system 202. The manufacturing execution system 302 may include multiple local systems 202 and multiple computing clouds 108. The manufacturing execution system 302 is used to control one or more basic automated systems 304. The manufacturing execution system 302 may use the techniques described in this disclosure to support the use of cloud computing in a more effective manner.

Figure 4:
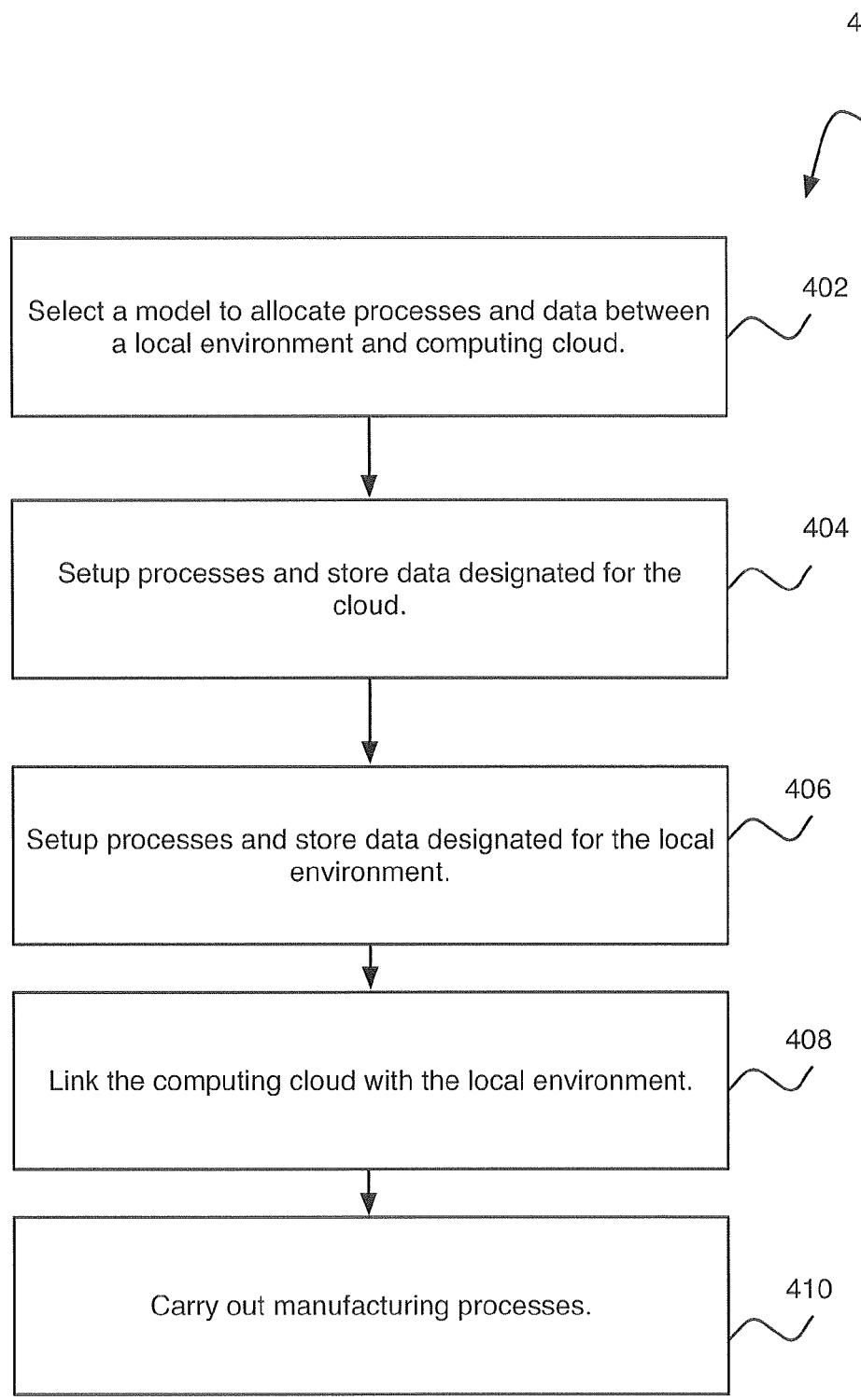
FIG. 4 illustrates an example method of allocating processes and data according to this disclosure.

FIG. 4 illustrates an example method 400 of allocating processes and data according to this disclosure. In this embodiment, a model is selected to allocate processes and data between a local environment 202 and a computing cloud 108 in block 402. In block 404, setup for various processes occurs and data is stored in the cloud. In block 406, setup for various other processes occurs and data is stored in the local environment. In block 408, the computing cloud 108 is linked to the local environment 202. In block 410, the manufacturing processes are carried out using the data and processes in both the cloud 108 and the local environment 202.

Figure 5:
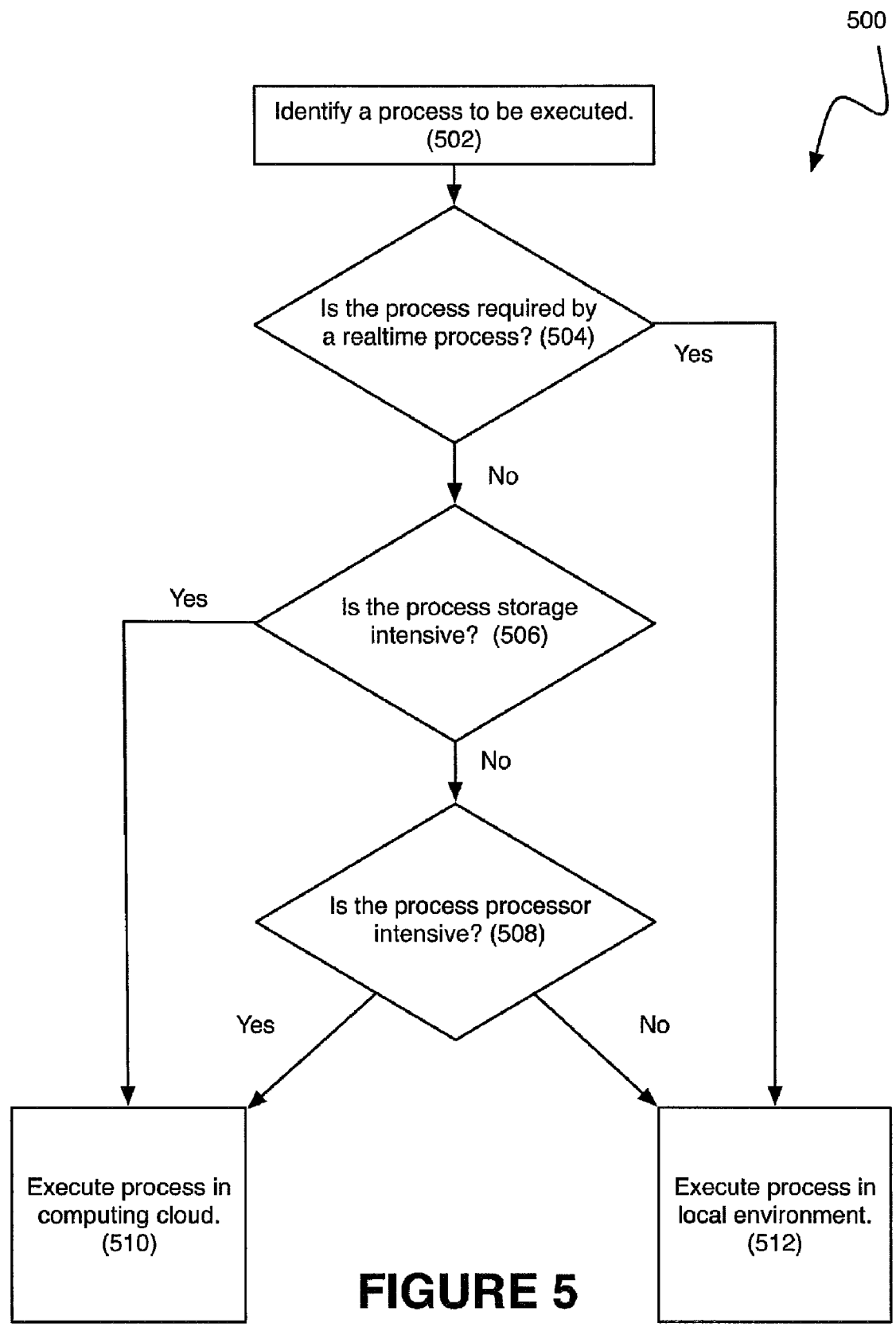
FIG. 5 illustrates another example method of allocating processes and data according to this disclosure.

FIG. 5 illustrates another example method 500 of allocating processes and data according to this disclosure. In particular, FIG. 5 illustrates one method of determining if a particular process is going to be executed in the local environment 202 or in the computing cloud 108 using real time and non-real time delineations. As shown in FIG. 5, a process to be executed is identified in block 502. In block 504, a determination is made as to whether the process is required by a real time process. If the process is required by a real time process, the process is executed in the local environment 202 in block 512. If the process is not required by a real time process, a determination is made in block 506 as to whether the process is storage intensive. If the process is storage intensive, the process is executed in the computing cloud 108 in block 510. If the process is not storage intensive, a determination is made in block 508 as to whether the process is processor intensive. If the process is processor intensive, the process is executed in the computing cloud 108 in block 510; otherwise, the process is executed in the local environment 202 in block 512. A similar method may be used to determine if data (instead of a process) should be stored in the local environment 202 or in the computing cloud 108.

Figure 6:
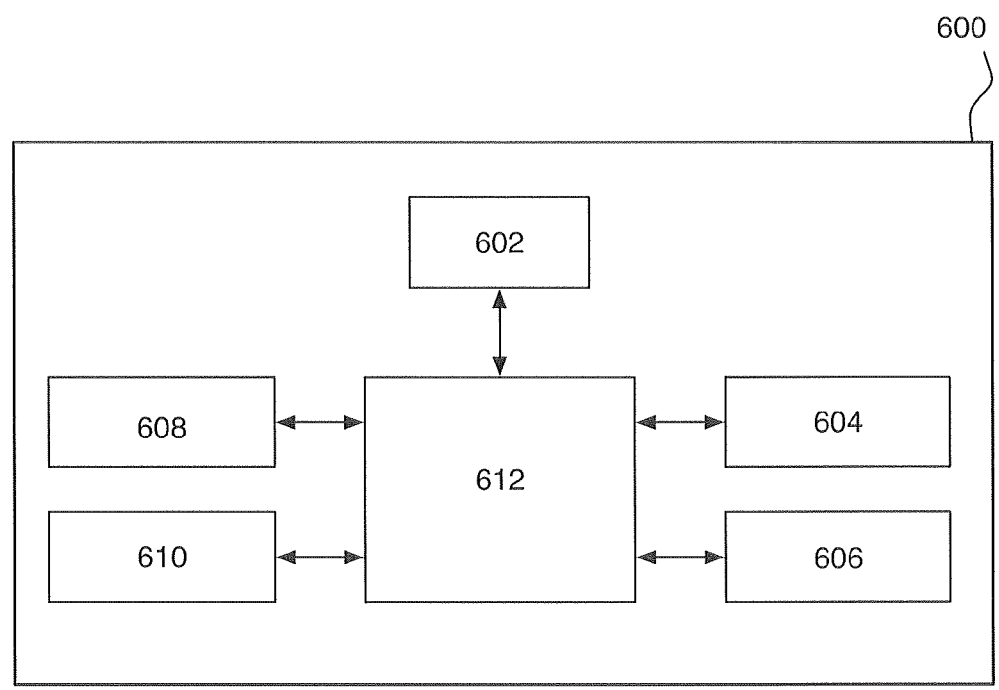
FIG. 6 illustrates an example computer system supporting cloud computing according to this disclosure.

FIG. 6 illustrates an example computer system 600 supporting cloud computing according to this disclosure. The computing cloud 108 and elements of the local environment 202 described above may each be implemented on any special-purpose or general-purpose computer with sufficient processing power, memory resources, and network throughput capability to handle the necessary workload placed upon it. A consumer home personal computer, networked to computing cloud 108 through a wide area network such as the Internet, may be used in conjunction with the disclosed embodiments. The consumer home personal computer may share some or all of the elements of computing cloud 108. FIG. 6 illustrates a typical computer system suitable for implementing one or more embodiments disclosed above. The computer system 600 includes a processor 612 (which may be referred to as a central processor unit or "CPU") that is in communication with memory devices including secondary storage 602, read only memory (ROM) 604, and random access memory (RAM) 606. The computer system 600 also includes input/output (I/O) 608 devices and network connectivity devices 610. The processor 612 may be implemented as one or more CPU chips.

The secondary storage 602 typically includes one or more optical drives, disk drives, tape drives, or other storage devices and is often used for non-volatile storage of data and as an over-flow data storage device if RAM 606 is not large enough to hold all working data. The secondary storage 602 may be used to store programs that are loaded into RAM 606 when such programs are selected for execution. The ROM 604 is often used to store instructions and perhaps data that are read during program execution. The ROM 604 is typically a non-volatile memory device that has a small memory capacity relative to the larger memory capacity of the secondary storage 602. The RAM 606 is often used to store volatile data and perhaps to store instructions. Access to both the ROM 604 and the RAM 606 is typically faster than to the secondary storage 602.

The I/O devices 608 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 610 may include modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 610 may enable the processor 612 to communicate over the Internet or one or more intranets. With such a network connection, the processor 612 can receive information from a network or output information to a network in the course of performing the above-described functions. Such information may be received from and outputted to the network, for example, in the form of a computer data baseband signal or a computer data signal embodied in a carrier wave. The baseband signal or signal embodied in the carrier wave generated by the network connectivity devices 610 may propagate in or on the surface of electrical conductors, in coaxial cables, in waveguides, in optical media such as optical fiber, or in the air or free space. The information contained in the baseband signal or signal embedded in the carrier wave may be ordered according to different sequences as may be desirable for either processing or generating the information or transmitting or receiving the information. The baseband signal or signal embedded in the carrier wave or other types of signals currently used or hereafter developed (referred to as the "transmission medium") may be generated according to several methods well known to one skilled in the art.

The processor 612 executes instructions, codes, computer programs, or scripts that it accesses from hard disk, floppy disk, optical disk (or other secondary storage 602), ROM 604, RAM 606, or the network connectivity devices 610. The processor 612 could include any suitable computing device, such as a microprocessor, microcontroller, field programmable gate array, application specific integrated circuit, or digital signal processor.

Although the figures above have illustrated various details regarding the use of cloud computing in industrial application, various changes may be made to these figures. For example, the functional divisions shown in various figures are for illustration only. Components in a device, system, or environment could be combined, omitted, or further subdivided or additional components could be added according to particular needs. Also, while shown as a series of steps, various steps in FIGS. 4 and 5 could overlap, occur in parallel, occur in a different order, or occur multiple times. In addition, these steps could occur at any suitable time(s), such as in response to a command from a user or from an external device or system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have some relationship to, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
    a computing cloud comprising at least one data storage device and at least one processing device, wherein the computing cloud is configured to provide shared services to a plurality of industrial automation systems;
    a client configured to communicate with the computing cloud and selectively offload data from a local system to the computing cloud based upon one or more specified criteria, the client also configured to offload processes from the local system to the computing cloud based upon the one or more specified criteria, wherein at least one of the one or more specified criteria is based upon a determination of whether data or processes are required for at least one real-time process, and, in response to determining that the data or processes are required for at least one real-time process, the data or processes are not offloaded to the computing cloud;
    wherein at least one of the industrial automation systems is configured to use at least one of the shared services of the computing cloud and at least one service from the local system.

2. The system of claim 1, wherein:
    the client is configured to connect to a plurality of computing clouds.

3. The system of claim 1, wherein the computing cloud supports a Service Oriented Architecture (SOA).

4. The system of claim 1, wherein the client and the computing cloud are configured to communicate through a secure protocol.

5. The system of claim 1, wherein the client forms a part of the local system.

6. The system of claim 1, wherein the industrial automation systems are further configured to use the offloaded data and the offloaded processes.

7. The system of claim 1, wherein at least one of the industrial automation systems forms a part of a manufacturing execution system.

8. The system of claim 1, wherein the one or more specified criteria further include a determination of whether the data or processes are storage intensive or data intensive.

9. The system of claim 8, wherein:
    the client is configured to transmit information relating to at least one of the industrial automation systems to the computing cloud; and
    the information comprises information obtained by the client from the local system.

10. A method comprising:
    determining which data among a group of data are to be stored in a local environment;
    determining which processes among a group of processes are to be performed in the local environment;
    sending data that are not to be stored in the local environment to a computing cloud, the computing cloud providing shared services to a plurality of industrial automation systems;
    delegating processes that are not to be performed in the local environment to the computing cloud; and
    operating the local environment by using the data stored in the local environment and the data stored in the computing cloud and by using the processes performed in the local environment and the processes performed in the computing cloud;
    wherein the determination of which data are stored locally and the determination of which processes are performed locally are based upon one or more specified criteria, at least one of the one or more specified criteria is based upon a determination of whether the data or processes are required for at least one real-time process and, in response to determining that the data or processes are required for at least one real-time process, the data or processes are not offloaded to the computing cloud; and
    wherein a client that operates in the local environment is configured to control at least one of the industrial automation systems.

11. The method of claim 10, wherein the one or more specified criteria further include a determination of whether the data or processes are data intensive.

12. The method of claim 10, wherein the computing cloud supports a Service Oriented Architecture (SOA).

13. The method of claim 10, wherein the one or more specified criteria further include a determination of whether the data or processes are storage intensive.

14. The method of claim 10, wherein at least one of the industrial automation systems forms a part of a manufacturing execution system.

15. The method of claim 10, wherein the client is configured to connect to a plurality of computing clouds.

16. The method of claim 10, wherein the client connects to the computing cloud through at least one secure bus, and wherein services offered by the computing cloud appear to the client as local services.

17. A cloud computing apparatus comprising:
at least one network interface configured to provide a service bus connection enabling a Service Oriented Architecture (SOA) service;
at least one data storage device configured to provide shared storage space to a plurality of industrial automation systems through the service bus connection; and
at least one processing device configured to provide functional services to the plurality of industrial automation systems through the at least one service bus connection;
wherein the apparatus is configured to provide the functional services based upon one or more specified criteria, at least one of the specified criteria is based upon whether a functional service is a high level or low level function, wherein the apparatus provides industrial automation support for one or more high level functions, the one or more high level functions comprising one or more functions not directly tied to an operation of a piece of machinery, and wherein at least one of the specified criteria is based upon a determination of whether data or processes are required for at least one real-time process and, in response to determining that the data or processes are required for at least one real-time process, the data or processes are not offloaded to the service bus.

18. The apparatus of claim 17, wherein at least another of the specified criteria is based upon whether the functional service is required in real-time.

19. The apparatus of claim 17, wherein the SOA service is used to connect the apparatus to at least one client.

20. The apparatus of claim 17, wherein at least another of the specified criteria is based upon whether the functional service is storage intensive or data intensive.

* * * * *